United States Patent
Deutloff et al.

(10) Patent No.: US 10,071,718 B2
(45) Date of Patent: *Sep. 11, 2018

(54) SETTING DEVICE, PARTICULARLY A MOTOR VEHICLE PARKING BRAKE

(71) Applicant: Brose Fahrzeugteile GmbH & Co. Kommanditgesellschaft, Würzburg, Würzburg (DE)

(72) Inventors: Norbert Deutloff, Thüngersheim (DE); Ekkehard Kraft, Retzstadt (DE); Stephan Roos, Wertheim (DE); Armin Sauer, Arnstein (DE)

(73) Assignee: BROSE FAHRZEUGTEILE GMBH & CO. KOMMANDITGESELLSCHAFT, WÜRZBURG, Würsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,906

(22) Filed: Feb. 13, 2014

(65) Prior Publication Data

US 2014/0231194 A1    Aug. 21, 2014

Related U.S. Application Data

(62) Division of application No. 10/596,686, filed as application No. PCT/EP2004/052705 on Oct. 28, 2004, now Pat. No. 8,662,263.

(30) Foreign Application Priority Data

Dec. 22, 2003 (DE) .................................. 103 61 127

(51) Int. Cl.
*B60T 13/74* (2006.01)
*B60T 7/10* (2006.01)
*B60T 13/02* (2006.01)

(52) U.S. Cl.
CPC ............ *B60T 13/746* (2013.01); *B60T 7/107* (2013.01); *B60T 13/02* (2013.01)

(58) Field of Classification Search
CPC ...... B60T 13/743; B60T 13/746; B60T 7/107; B60T 7/122; B60T 11/046; F16D 2121/26; F16D 2125/40
See application file for complete search history.

(56) References Cited

U.S. PATENT DOCUMENTS

| 3,161,074 A | 12/1964 | Korthaus et al. |
| 4,532,462 A | 7/1985 | Washbourn et al. |
| (Continued) | | |

FOREIGN PATENT DOCUMENTS

| DE | 4434401 C1 | 11/1995 |
| DE | 100 43 739 A1 | 3/2002 |
| (Continued) | | |

OTHER PUBLICATIONS

Communication received from the U.S. Patent and Trademark Office in connection with corresponding U.S. Appl. No. 10/596,686 including Restriction Requirement dated Feb. 3, 2010, 6 pages; Non-Final Rejection dated May 11, 2010, 13 pages; Final Rejection dated Sep. 14, 2010, 9 pages; Advisory Action dated Dec. 3, 2010, 3 pages; Non-Final Rejection dated Feb. 7, 2011, 10 pages; (continued in row 2).

(Continued)

*Primary Examiner* — Bradley T King
*Assistant Examiner* — Stephen M Bowes
(74) *Attorney, Agent, or Firm* — Westman, Champlin & Koehler, P.A.

(57) ABSTRACT

A setting device, particularly a motor vehicle parking brake includes a remotely-operated drive, a hollow shaft, a spindle shaft and an elastic element. The hollow shaft is driven by the remotely-operated drive so that the hollow shaft rotates.

(Continued)

The spindle shaft moves relative to the hollow shaft within the hollow shaft due to the rotation of the hollow shaft. The spindle shaft is connected to a brake cable such that the spindle shaft can apply and release the brake as it moves in different directions within the hollow shaft. The elastic element is loaded due to movement of the hollow shaft as the hollow shaft is driven in an attempt to release the brake while the brake cable is blocked.

12 Claims, 10 Drawing Sheets

(56) References Cited

U.S. PATENT DOCUMENTS

| | | | |
|---|---|---|---|
| 5,092,432 A | 3/1992 | Taig | |
| 5,180,038 A | 1/1993 | Arnold et al. | |
| 5,775,469 A | 7/1998 | Kang | |
| 6,244,394 B1* | 6/2001 | Gutierrez et al. | 188/72.8 |
| 6,267,207 B1* | 7/2001 | Fleischer et al. | 188/162 |
| 6,364,085 B1* | 4/2002 | Ueno et al. | 192/219.4 |
| 7,341,127 B2 | 3/2008 | Gil et al. | |
| 7,648,006 B2 | 1/2010 | Deutloff et al. | |
| 8,662,263 B2 | 3/2014 | Deutloff et al. | |
| 2002/0084154 A1 | 7/2002 | Peter | |
| 2003/0066714 A1 | 4/2003 | Flynn et al. | |
| 2003/0075001 A1 | 4/2003 | Petrak | |
| 2003/0227010 A1 | 12/2003 | Petrak | |
| 2005/0115774 A1 | 6/2005 | Nieto Gil et al. | |

FOREIGN PATENT DOCUMENTS

| | | |
|---|---|---|
| DE | 101 02 685 A1 | 8/2002 |
| DE | 101 41 246 C1 | 4/2003 |
| WO | 98/56633 A1 | 12/1998 |

OTHER PUBLICATIONS

Final Rejection dated Jun. 29, 2011, 9 pages; Advisory Action dated Nov. 3, 2011, 3 pages; Non-Final Rejection dated Jan. 30, 2012, 11 pages; Final Rejection dated Sep. 28, 2012, 12 pages; Miscellaneous communication dated Oct. 4, 2012, Oct. 16, 2012, Oct. 24, 2012, 28 pages total; Non-Final Rejection dated Jun. 17, 2013, 7 pages; Notice of Allowance dated Jan. 13, 2014, 5 pages.
International Search Report and Written Opinion of the International Searching Authority for PCT Application No. PCT/EP2004/052705, dated Mar. 3, 2005, 19 pages.
Japanese Office Action (including English translation) for Japanese Patent Application No. 2006-546138, dated Jun. 25, 2009, 3 pages.

* cited by examiner

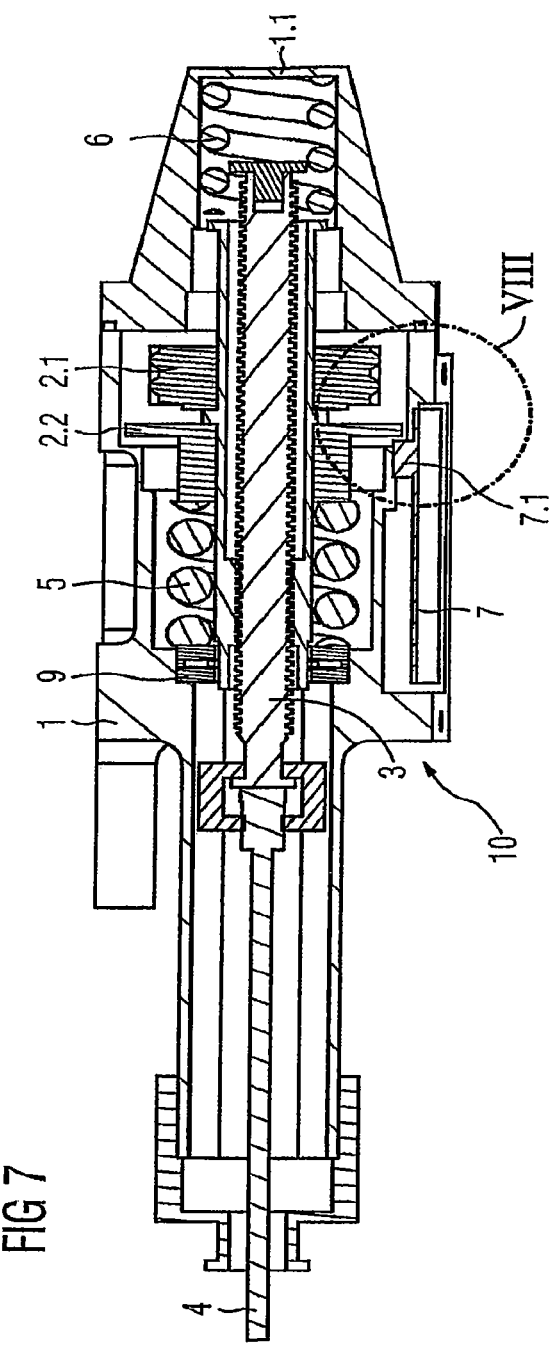
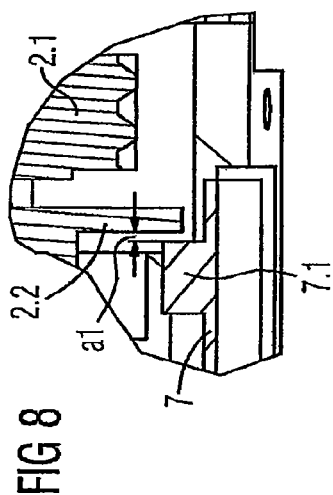
FIG 7
FIG 8

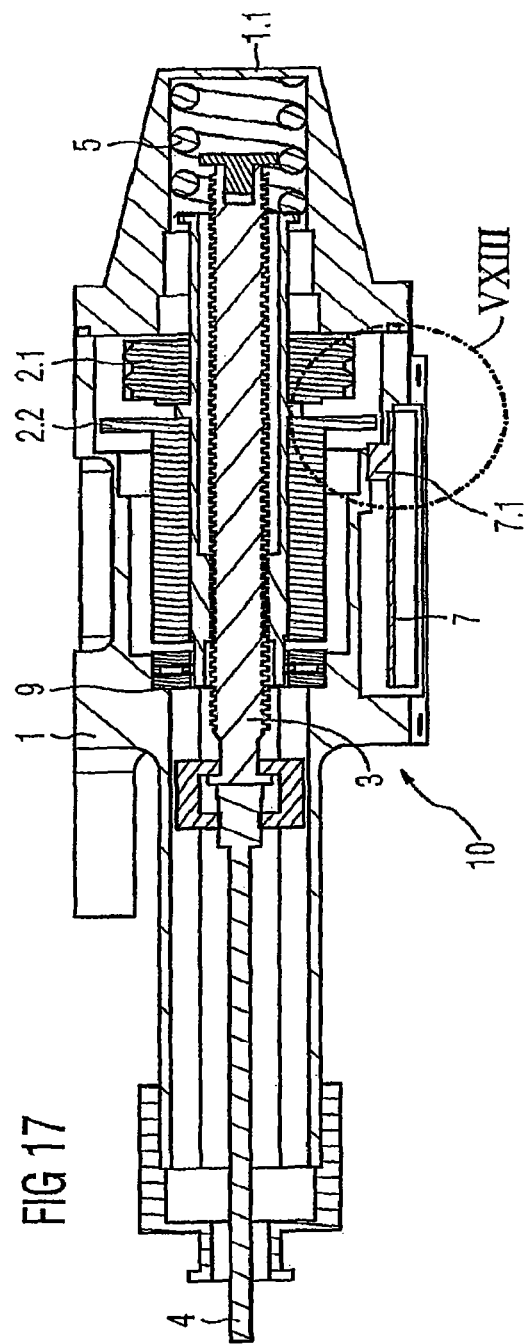

SETTING DEVICE, PARTICULARLY A MOTOR VEHICLE PARKING BRAKE

CROSS-REFERENCE TO RELATED APPLICATION

The present application is a divisional of U.S. patent application Ser. No. 10/596,686, filed May 3, 2007, which is a U.S. national stage application of International Application No. PCT/EP2004/052705 filed Oct. 28, 2004, which designates the United States of America, and claims priority to German application number DE 103 61 127.4 filed Dec. 22, 2003, each of the above-referenced applications is hereby incorporated by reference in their entirety.

FIELD

The invention relates to a setting device, particularly a motor vehicle parking brake.

BACKGROUND

An actuation mechanism for a brake with a brake cable which can be operated by an actuator via a spindle shaft and with a force sensor for determining the mechanical loading of the brake cable on application of the brake is known from DE 101 02 685 A1, in which the mechanical load on the brake cable via the actuator, decoupled from the brake cable, can be determined. The force sensor contains a spring screw arranged axially between the brake side end of the spindle shaft and a housing accommodating the actuation mechanism, of which the change in length on actuation of the spindle shaft to apply the brake is measured by a Hall chip within the spring screw and serves as a measure for the force exerted on the brake cable when the brake is applied.

SUMMARY

According to the object of the present invention, using a mechanism of the type described above as its starting point, a setting device is to be created which stands out by virtue of its compact design and makes it possible in a simple manner also to measure the brake cable force when the brake is released, especially if blocking occurs.

The aforementioned object can be achieved by a setting device comprising a setting unit featuring a remotely-operated drive, a telescopic device movable axially in a housing or similar in a longitudinal axis of the setting unit, containing a hollow shaft and a spindle shaft connected to it in a manner that enables it to rotate and advance and actuate a brake cable, a non-rotating axially movable connection between the remotely-operated drive and the hollow shaft, and an axial advancing support between the hollow shaft on the one side and the housing on the other side via at least one elastic element stationary relative to the spindle shaft and the brake cable and arranged in parallel in the direction of hollow shaft loaded axially by the advancing support and thereby axially deformable.

The object can also be achieved by a motor vehicle parking brake, comprising a drive unit featuring a remotely-operated drive, a telescopic device movable axially in a housing or similar in a longitudinal axis of the setting unit, containing a hollow shaft and a spindle shaft connected to it in a manner that enables it to rotate and advance and actuate a brake cable, a non-rotating axially advanceable connection between the remotely-operated drive and the hollow shaft, and an axially advancing support between the hollow shaft on the one side and the housing one the other side via at least elastic element stationary relative to the spindle shaft and the brake cable during a drive into the release position of the brake of an axially loaded and thereby axially longitudinally deformable elastic element.

A setting device may further comprise an electric motor for the remotely-operated drive and/or a transmission between the remotely-operated drive and the hollow shaft. A setting device may further comprise an intermediate gear wheel between a drive gear element of the remotely-operated drive and a drive gear wheel of the hollow shaft; and an axial movement option between the intermediate gear wheel and the meshing drive gear wheel of the hollow shaft at least to the extent of the operational stroke distance of the at least one elastic element. The at least one elastic element can be used as a correspondingly axially moved force sensor emitter for its longitudinal deformation for the axial advancing force acting from the motorized drive via the hollow shaft on the spindle shaft. A setting device may further comprise a force sensor receiver which is stationary relative to the spindle shaft and the brake cable and assigned to the force sensor emitter and which can be in the form of a Hall chip assigned to the magnetic force sensor emitter. A setting device may further comprise an arrangement of the force sensor receiver as an integrated part of a control unit of the setting unit, which can be accommodated by a fixed circuit board. The control unit can be arranged in the area of the telescopic device. The at least one elastic element can be embodied as a spring screw. The at least one elastic element can be arranged or embodied as a spring screw surrounding the hollow shaft concentric to the hollow shaft or the spindle shaft especially in its opposite direction of rotational advance. The at least one elastic element can be embodied as a compression spring element. At least one elastic element can be embodied as a tension spring element. The at least one elastic element can be used as a force sensor emitter for determining the brake application force of a motor vehicle parking brake. The at least one elastic element can be used as a force sensor emitter for determining the brake release force of a motor vehicle parking brake. A first elastic element can be loaded axially by advancing support for an axial advancing movement of the telescopic device, on application of a motor vehicle parking brake; and a second elastic element can be loaded axially in the other axial direction of movement of the telescopic device by advancing support, on release of a motor vehicle parking brake. A setting device may further comprise a different elasticity constant of the first elastic element by comparison with the elasticity constant of the second elastic element. A setting device may further comprise a loading of the second elastic element after previous unloading of the first elastic element. A setting device may further comprise a zero point detection between the transition of the unloading of the first elastic element on the one hand and the loading of the second elastic element on the other hand. A setting device may further comprise an arrangement of the second elastic element axially before or after the first elastic element. A setting device may further comprise a concentric arrangement in relation to each other of the first elastic element and of the second elastic element. A setting device may further comprise an embodiment of the at least one elastic element as a pressure compression element, with different compression spring constants by comparison with the tension spring element constant.

The arrangement of the elastic element in the area of the hollow shaft, especially in the form of a spring screw concentrically surrounding the hollow shaft and the spindle shaft, allows a compact design, in particular an axial design, to be easily achieved.

By embodying the at least one elastic element both as a compression spring element and also as a tension spring element, a force measurement and thereby brake cable monitoring is advantageously made possible both on application and also on release of the brake; In accordance with an advantageous embodiment of the invention, it is possible to separate the application force measurement from the release force measurement while retaining a compact design by using two spring screws arranged concentrically to each other. A further separation option while retaining a compact design is advantageously possible by arranging the second elastic element in the space to be kept free for the lifting movement of the spindle shaft, with the end of the spindle shaft being able to penetrate into the interior of the elastic element embodied as the spring screw.

The parallel, especially concentric, compact and simple design provided by the arrangement of the at least one elastic element can be even further refined by a force sensor receiver assigned to the force sensor emitter moved on axial deformation of the support being able to be fixed or contacted in the vicinity of the telescopic device, e.g. integrated on a shared circuit board, without the need for longer lines laid to provide flexibility.

BRIEF DESCRIPTION OF THE DRAWINGS

The invention as well as further advantageous embodiments in accordance with features of the subclaims are explained in more detail below with reference to schematic exemplary embodiments in the drawing; The Figures show:

FIGS. 7, 8 the setting device according to FIG. 1 in the brake setting with a first elastic element for brake application sensing and second elastic element supported axially to it for brake release sensing in an overall axial longitudinal cross section and in an enlarged section in the force sensor area;

FIGS. 17, 18 the setting device in accordance with FIGS. 15, 16 with the brake cable blocked on attempted release in an overall axial longitudinal cross section and in an enlarged section in the force sensor area.

DETAILED DESCRIPTION OF ILLUSTRATIVE EMBODIMENTS

Figure 1:
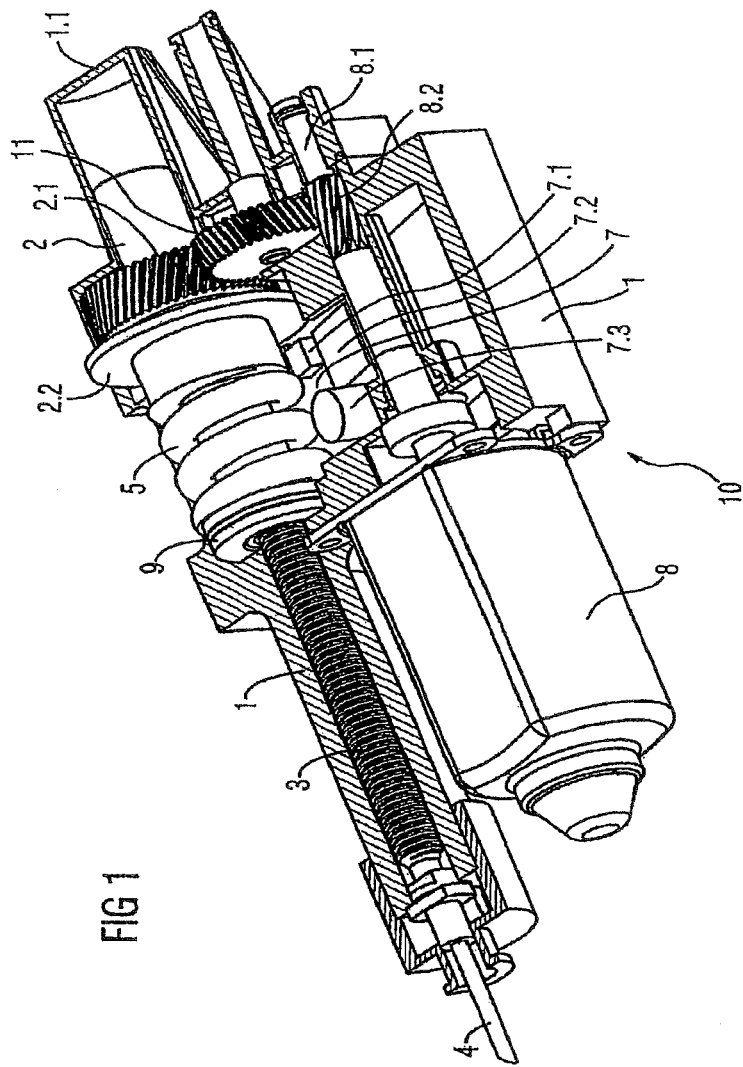
FIG. 1 an inventive setting device in a perspective axial part longitudinal section.

The following major components of the inventive setting device are accommodated by a housing 1 with an axially enclosing housing cover 1.1: An axially movable telescopic unit 2;3 containing a hollow shaft 2 and a spindle shaft 3 connected to this in a manner that allows it to rotate and advance and actuate a brake cable 4, as well as a setting unit 10 for the telescopic unit 2;3 with an electric motor 8, which, with a worm shaft 8.2 as part of its rotor shaft 8.1, drives a transmission gear wheel 2.1 which can be moved axially to it and is connected in a fixed manner to the hollow shaft 2 in a fixed drive connection via an intermediate gear wheel 11.

An elastic element 5 in the form of a spring screw concentrically enclosing the hollow shaft 2 or the spindle shaft 3 is provided as the advancing support for the hollow shaft 2, which as a compression spring rests with one of its ends via an axial thrust washer 9 against a shoulder of the housing 1 and with its other axial end on a force sensor emitter 2.2 with a fixed connection to the hollow shaft 2.

When the telescopic device 2; 3 is driven in the sense of a movement of the brake cable 4 to the right, i.e. in the sense of applying a motor vehicle parking brake not shown in any greater detail here, the elastic element 5 is compressed by being pressed against the axial bearing 9; Simultaneously, in accordance with the compression of the elastic element, the force sensor emitter 2.2. moves to the left; the distance covered here is thus a measure of the application force or brake force exerted on the brake cable 4 by the electric motor 8 via the gearing, the hollow shaft 2 and the spindle shaft 3.

Figure 2:
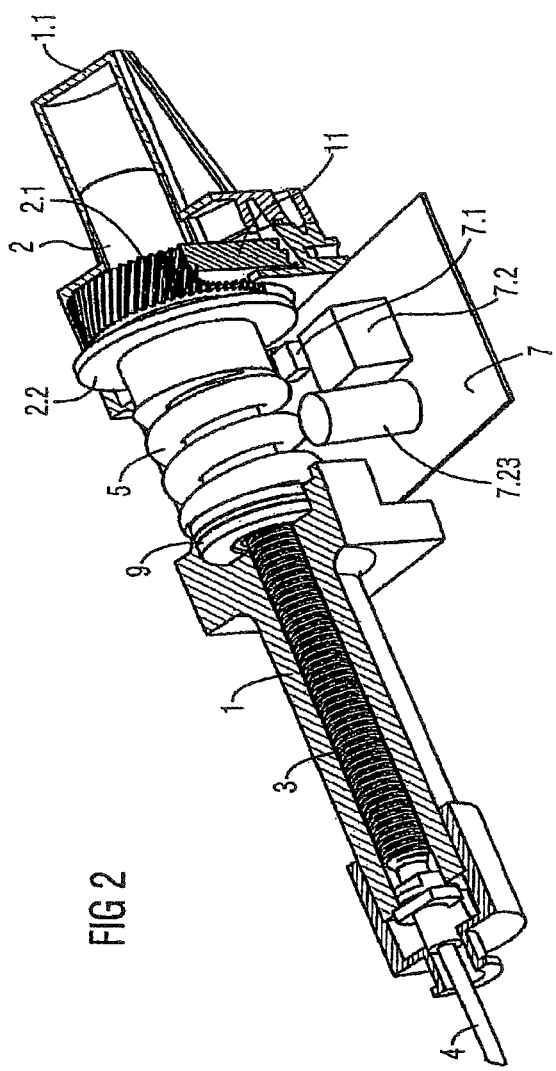
FIG. 2 the setting device shown in FIG. 1 with the control unit and force sensor unit removed for the sake of clarity.

In addition to the force sensor emitter 2.2, especially in the form of a ferromagnetic disk, a force sensor receiver 7.1 assigned to this emitter, especially in the form of a Hall chip, serves to determine the spring path during the support compression of the elastic element 5, especially in the form of spring screw. The force sensor receiver 7.1 is designed for simple manufacturing without the need for flexible lines and designed to exploit the compact available free space in the area of the elastic element 5 within the housing 1—as can especially be seen from FIG. 2—and an integrated component of a control unit 7.2; 7.3 for the setting device 10 preferably containing further electrical or electronic components 7.2 or 7.3, preferably accommodated on a control unit circuit board 7.

The constructive of functional relationship of the components described in basic terms above is explained in greater detail below with reference to different operating states of a parking brake when the brake is applied and/or released.

Figure 3:
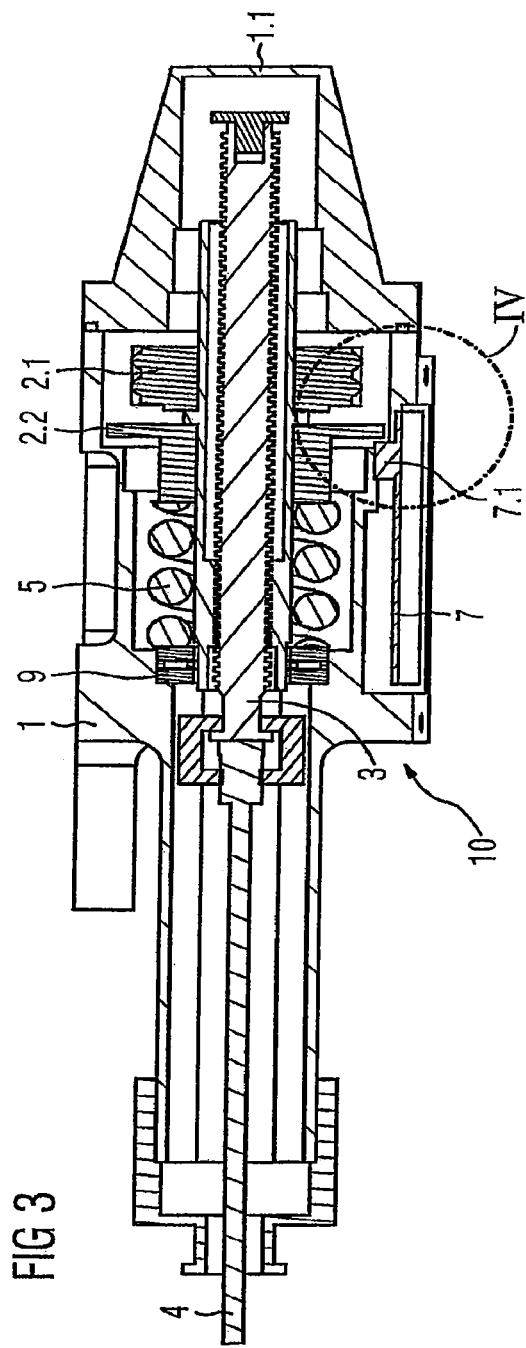
FIGS. 3, 4 the setting device according to FIG. 1 with the brake cable applying the brake in an overall axial longitudinal section and in an enlarged section in the force sensor area.

FIG. 3 shows an inventive setting device for a motor vehicle parking brake in the brake position with the brake applied, i.e. the brake cable 4 moved to the right; to do this a torque is transmitted from the electric motor 8 via its worm shaft 8.2 via the intermediate gear wheel 11 to the transmission drive wheel 2.1 permanently connected to the hollow shaft 2 functioning concentrically with it as a spindle nut An axial advancing movement is exerted on this spindle shaft 3 via the inner thread of the hollow shaft 2 via the outer thread of the spindle shaft 3 which meshes with it in the sense of an application of the parking brake by the brake cable 4. When the brake cable applies the brake 4 through the movement of the spindle shaft 3 into the brake setting shown in FIG. 3, the hollow shaft 2 is supported on the housing 1 via the elastic element 1 in the form of a spring screw concentrically surrounding the hollow shaft 2 or the inner meshing spindle shaft 3; to this end the elastic element, preferably as a compression spring, lies with its right-hand free end on the force sensor emitter 2.2 preferably permanently connected to the hollow shaft 2 and with its left-hand end via an axial thrust washer 9 on a shoulder of the housing 1.

Figure 4:
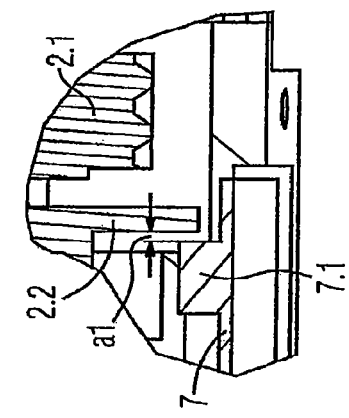

When the brake cable 4 is pulled on the elastic element 5 is compressed in proportion to the force exerted here on the brake cable 4 via the spindle shaft 3; the hollow shaft 2 or the gearing drive wheel 2.1 permanently connected to it is in this case accordingly able to be moved axially relative to the intermediate gear wheel 11. The path corresponding to this compression deformation of the elastic element 5 is—according to the enlarged section in FIG. 4—recorded as the dimension a1 between the force sensor emitter 2.2 which is also moved on the one hand and the assigned, force sensor receiver 7.1 which remains stationary and is recorded in the control unit advantageously also arranged on the same control unit circuit board 7 for the setting unit 10 and processed into a representative brake force measurement variable.

Figure 5:
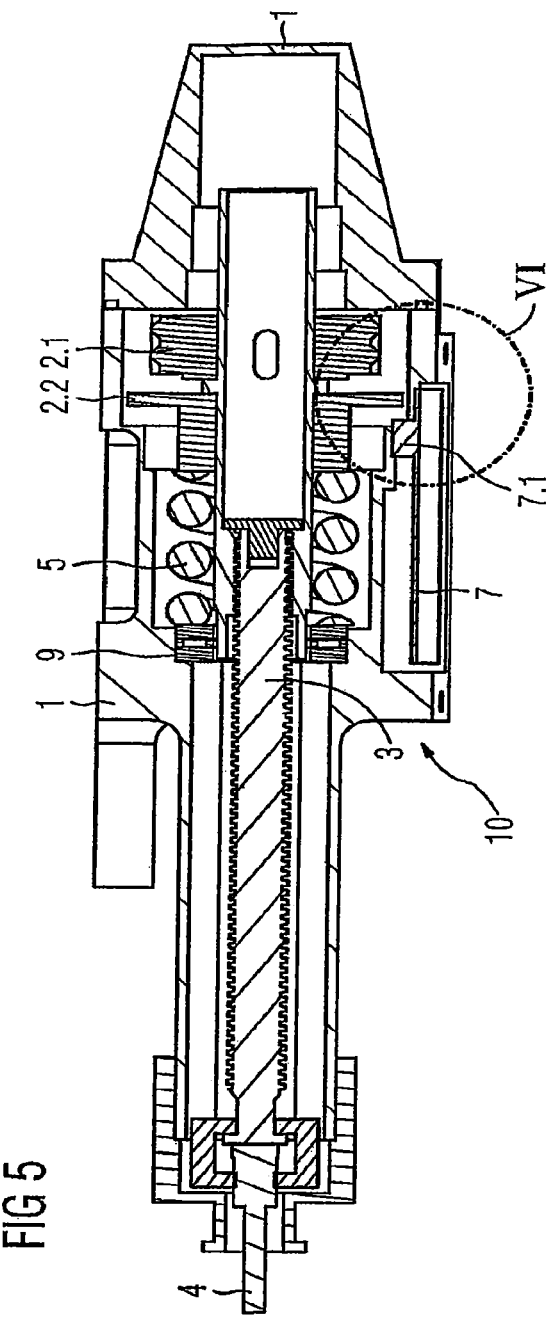
FIGS. 5, 6 the setting device according to FIGS. 3, 4 with the brake cable released in an overall axial longitudinal cross section and in an enlarged section in the force sensor area.
Figure 6:
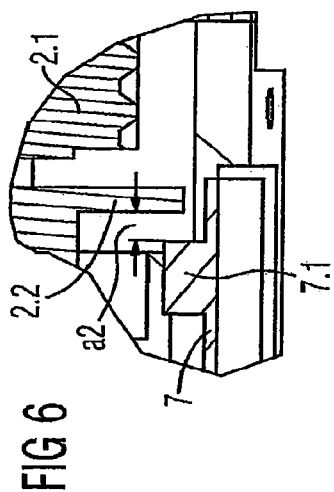

FIG. 5 shows the setting device according to FIG. 3 with released parking brake with spindle shaft 3 with brake cable 4 correspondingly moved into a left-hand release position; There is no load on the elastic element 5, correspondingly—according to the enlarged section in FIG. 6—the force sensor emitter 2.2 has increased its distance to the force sensor receiver 7.1 to a dimension a2.

As additions to the previous examples, FIGS. 7, 8 or FIGS. 9, 10 show a second elastic element 6 which is assigned to the release movement of the brake cable 4 and which monitors the cable for a correct execution sequence, especially for detection of a blocking case.

FIGS. 7, 8 show a correct brake setting with the spindle shaft 3 moved into a right-hand brake setting in accordance with FIG. 7 and a dimension a1 corresponding to a defined pressure load of the first elastic element 5 between the force sensor emitter 2.2 on the one side and the force sensor receiver 7.1 on the other side according to FIG. 8. The second elastic element 6 is not subject to any load. A compact design is achieved by the right-hand end of the spindle shaft 3 being able to move within a spring screw provided as an elastic element 6 and thereby advantageously no additional space being needed.

Figure 9:
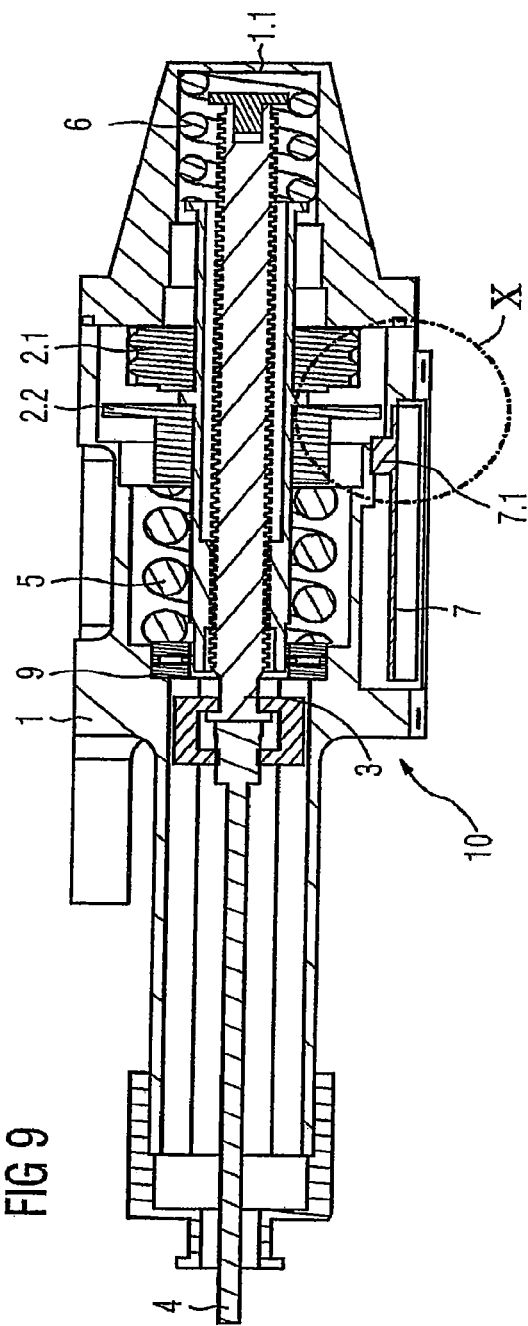
FIGS. 9, 10 the setting device according to FIGS. 7, 8 with a brake cable blocked on attempted release in an overall axial longitudinal cross section and in an enlarged section in the force sensor area.
Figure 10:
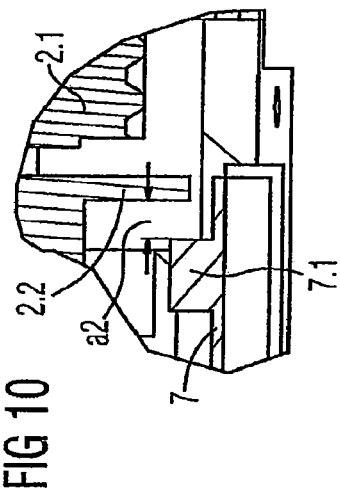

FIGS. 9, 10 now explain an attempt to release the brake when blocking of the brake cable 4 has occurred—e.g. caused by it icing up. In the attempted release the spindle shaft 3 and the hollow shaft 2 move by a small amount—documented by the difference of the dimension a1 according to FIG. 8 compared to the dimension a2 according to FIG. 10, with the hollow shaft 2 hitting the second elastic element 6 and causing this to compress and a defined force analysis being enabled via the processing of the dimension a2.

FIGS. 11, 12 or FIGS. 13, 14 show a further inventive embodiment with a first elastic element 5 for measuring brake application force and also a second elastic element 6 for measuring brake release force. Both elastic elements are embodied as screw springs and engage concentrically to each other with the hollow shaft 2 or the spindle shaft 3 in a compact design in the area of the control unit 7.2; 7.3.

Figure 11:
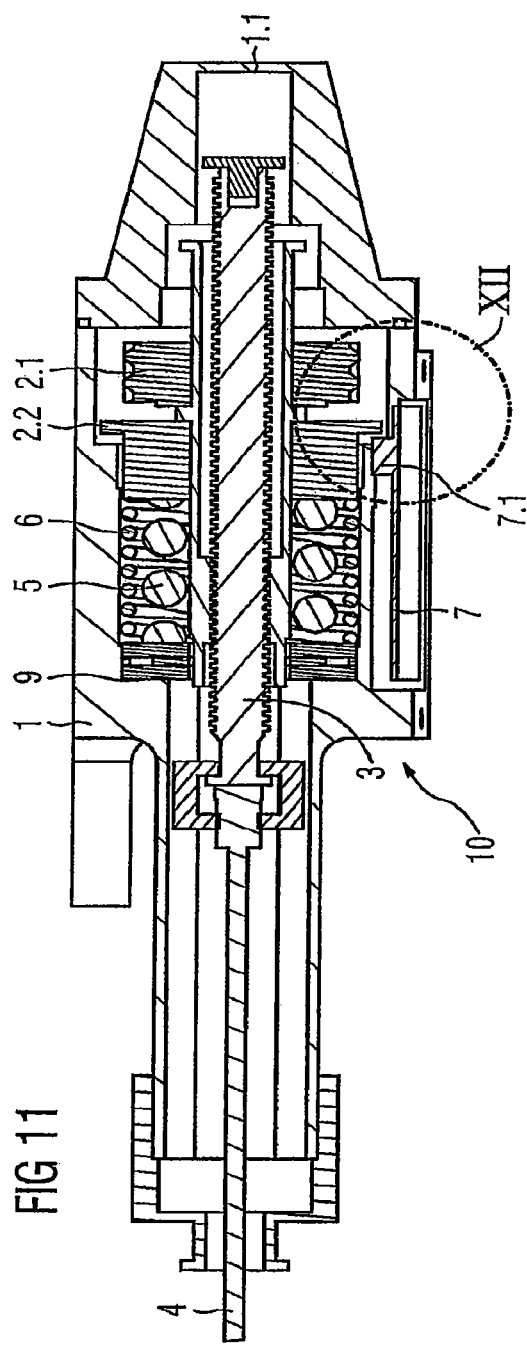
FIGS. 11, 12 the setting device to FIG. 1 in the brake setting with a first elastic element for brake application sensing and a second elastic element concentric with it for brake release sensing in an overall axial longitudinal cross section and in an enlarged section in the force sensor area.
Figure 12:
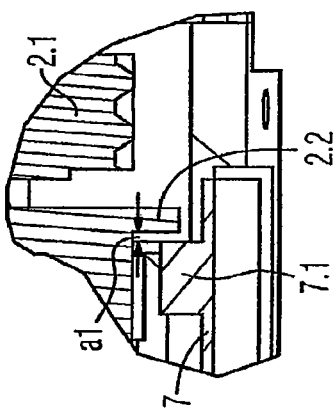
Figure 13:
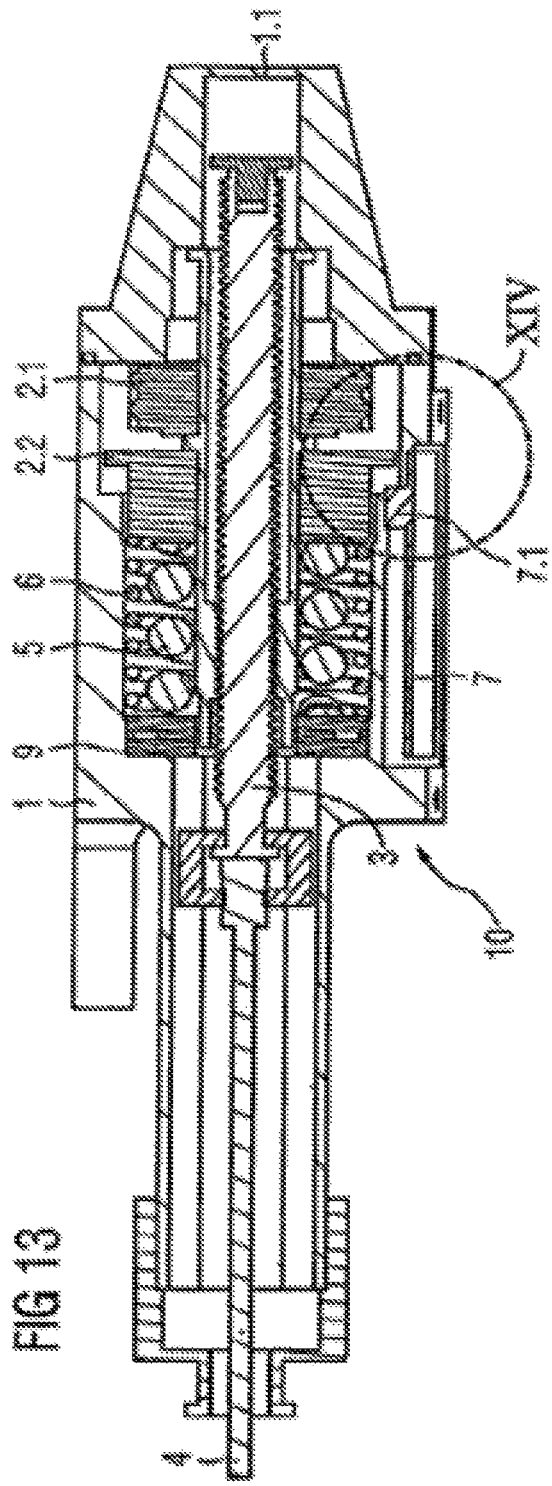
FIGS. 13, 14 the setting device according to FIGS. 11, 12 with a brake cable blocked on attempted release in an overall axial longitudinal cross section and in an enlarged section in the force sensor area.
Figure 14:
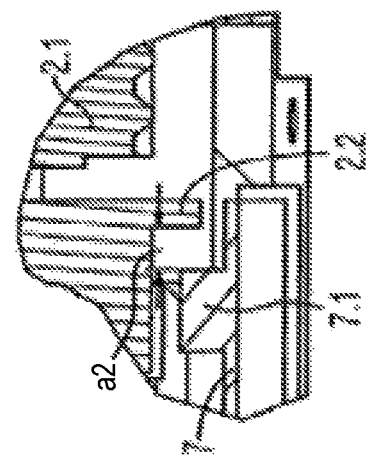

FIG. 11 shows the brake setting with the spindle shaft 3 driven to the right into its end brake setting and according to FIG. 12 with the corresponding dimension a1 between the force sensor emitter 2.2 on one side and the assigned force sensor receiver 7.1 on the other side. The second elastic element 6 is in this case connected in parallel to the first elastic element 5 in order to have the same effect, however according to one embodiment of the invention is provided with a different spring characteristic such that a support for the advancing movement resulting from the spring force compression still remains if, as assumed in FIGS. 13, 14—e.g. by reversing the direction of rotation of the electric motor—the drive of the hollow shaft 2 and the spindle shaft 3 is undertaken in the sense of a brake release movement of the brake cable 4 and through this the larger dimension a2 according to FIG. 14 is produced. As can be seen from FIG. 11, at the right-hand end of the hollow shaft 2 there is a stop, especially provided on the housing cover 1.1, by which it is possible to prevent the axial movement of the hollow shaft 2 exceeding the maximum spring travel of the second elastic element 6; through a corresponding axial play before the stop of the hollow shaft 2 a clear identification of the zero point between the end of the loading of the first elastic element 5 and the continuing load pressure on the second elastic element 6 on transition to the release attempt according to FIGS. 13, 14 is possible in a simple manner; A further clarification is provided according to an embodiment by selecting different elasticity or spring constants of the elastic element 5 or 6.

FIGS. 15, 16 or FIGS. 17, 18 show the inventive solution according to claim 22 for a setting direction with only one monitoring of the release movement of the parking brake.

Figure 15:
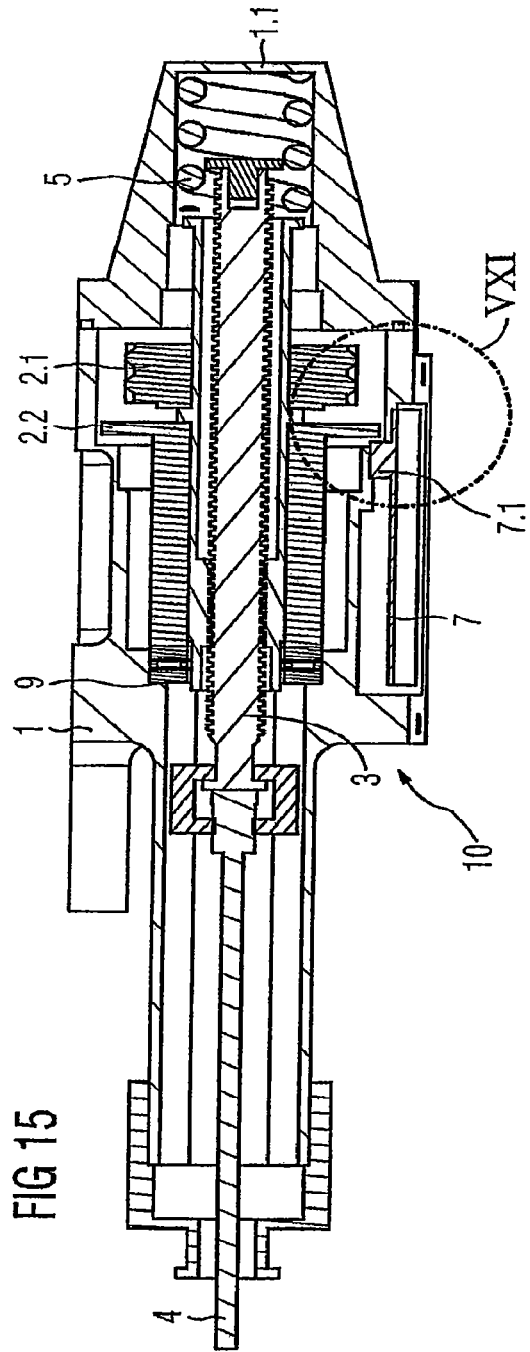
FIGS. 15, 16 the setting device in accordance with FIG. 1 with a single elastic element for brake release sensing with the brake cable applied in an overall axial longitudinal cross section and in an enlarged section in the force sensor area.
Figure 16:
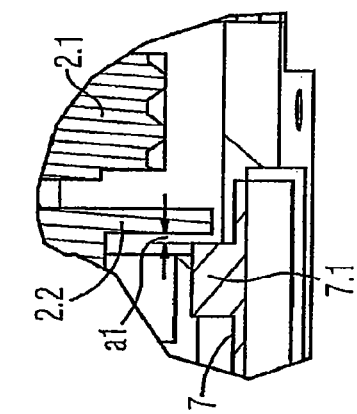

FIG. 15 additionally shows the spindle shaft 8 in its right-hand brake setting with brake cable 4 pulled on. The hollow shaft 2 is supported via the force sensor emitter 2.2 and the axial bearing 9 on the housing 1; the corresponding dimension a1 is also specified in the enlarged section according to FIG. 16.

FIGS. 17, 18 illustrate the detection of blocking of the brake cable 3 when an attempt is made to release the brake. The blocked brake cable 4 presses the spindle shaft 3 as well as the hollow shaft 2 to the right against the elastic element 5; accordingly the force sensor emitter 2.2 moves by the increased dimension a2 in relation to the force sensor receiver 7.2. Force sensor-receiver 7.2 and hollow shaft 2 in this case no longer rest against the left-hand shoulder of the housing 1.

The invention relates to a setting device, especially for a motor vehicle parking brake, with a telescopic device 2; 3 containing a hollow shaft 2 a spindle shaft 3 with an axial rotary advancing connection to it which operates a brake cable 4 movable axially in a housing or such like, as well as with an axial advancing movement support between the hollow shaft 2 and the housing 1 via at least one elastic element 5, which serves as a force sensor for a brake application or a blocked brake release; according to one embodiment a second elastic element 6 is provided for blocking detection of the brake cable 4 on an attempt to release the brake and according after the tension on the first elastic element 5 is released.

At least the following exemplary embodiments are disclosed herein:

Embodiment 1

A setting device, in particular a motor vehicle parking brake, comprising a setting unit featuring a remotely-operated drive, a telescopic device movable axially in a housing or similar in a longitudinal axis of the setting unit, containing a hollow shaft and a spindle shaft connected to it in a manner that enables it to rotate and advance and actuate a brake cable, a non-rotating axially movable connection between the remotely-operated drive and the hollow shaft, and an axial advancing support between the hollow shaft on the one side and the housing on the other side via at least one elastic element stationary relative to the spindle shaft and the brake cable and arranged in parallel in the direction of the hollow shaft loaded axially by the advancing support and thereby axially deformable.

Embodiment 2

A setting device according to embodiment 1, comprising an electric motor for the remotely-operated drive.

Embodiment 3

A setting device according to embodiment 1 and/or 2, comprising a transmission between the remotely-operated drive and the hollow shaft.

Embodiment 4

A setting device according to embodiment 3, comprising an intermediate gear wheel between a drive gear element of the remotely-operated drive and a drive gear wheel of the hollow shaft; and an axial movement option between the intermediate gear wheel and the meshing drive gear wheel of the hollow shaft at least to the extent of the operational axial stroke distance of the at least one elastic element.

Embodiment 5

A setting device according to at least one of embodiments 1 to 4, wherein the at least one elastic element is used as a correspondingly axially moved force sensor emitter for its longitudinal deformation for the axial advancing force acting from the motorized drive via the hollow shaft on the spindle shaft.

Embodiment 6

A setting device according to embodiment 5, comprising a force sensor receiver which is stationary relative to the spindle shaft and the brake cable and assigned to the force sensor emitter and which can be in the form of a Hall chip assigned to the magnetic force sensor emitter.

Embodiment 7

A setting device according to embodiment 6, comprising an arrangement of the force sensor receiver as an integrated part of a control unit of the setting unit, which can be accommodated by a fixed circuit board.

Embodiment 8

A setting device according to embodiment 7, wherein the control unit is arranged in the area of the telescopic device.

Embodiment 9

A setting device according to at least one of embodiments 1 to 8, wherein the at least one elastic element is embodied as a spring screw.

Embodiment 10

A setting device according to embodiment 9, wherein the at least one elastic element is arranged or embodied as a spring screw, in particular surrounding the hollow shaft, concentric to the hollow shaft or the spindle shaft, in particular in its opposite direction of rotational advance.

Embodiment 11

A setting device according to at least one of embodiments 1 to 10, wherein the at least one elastic element is embodied as a compression spring element.

Embodiment 12

A setting device according to at least one of embodiments 1 to 10, wherein the at least one elastic element is embodied as a tension spring element.

Embodiment 13

A setting device according to any of embodiments 5 to 12, wherein the at least one elastic element is used as a force sensor emitter for determining the brake application force of a motor vehicle parking brake.

Embodiment 14

A setting device according to any of embodiments 5 to 12, wherein the at least one elastic element is used as a force sensor emitter for determining the brake release force of a motor vehicle parking brake.

Embodiment 15

A setting device according to at least one of embodiments 1 to 14, wherein a first elastic element is loaded axially by advancing support for an axial advancing movement of the telescopic device, in particular on application of a motor vehicle parking brake; and wherein a second elastic element is loaded axially in the other axial direction of movement of the telescopic device by advancing support, in particular on release of a motor vehicle parking brake.

Embodiment 16

A setting device according to embodiment 15, comprising a different elasticity constant of the first elastic element by comparison with the elasticity constant of the second elastic element.

Embodiment 17

A setting device according to embodiment 15 and/or 16, comprising a loading of the second elastic element after previous unloading of the first elastic element.

Embodiment 18

A setting device according to at least one of embodiments 15 to 17, comprising a zero point detection between the transition of the unloading of the first elastic element on the one hand and the loading of the second elastic element on the other hand.

Embodiment 19

A setting device according to at least one of embodiments 15 to 18, comprising an arrangement of the second elastic element axially before or after the first elastic element.

Embodiment 20

A setting device according to at least one of embodiments 1 to 19, comprising a concentric arrangement in relation to each other of the first elastic element and of the second elastic element.

Embodiment 21

A setting device according to embodiment 1, comprising an embodiment of the at least one elastic element as a compression-tension element, in particular with different compression spring constant by comparison with the tension spring element constant.

Embodiment 22

A setting device, in particular a motor vehicle parking brake, comprising a drive unit featuring a remotely-operated drive, a telescopic device movable axially in a housing or similar in a longitudinal axis of the setting unit, containing a hollow shaft and a spindle shaft connected to it in a manner that enables it to rotate and advance and actuate a brake cable into a release position of a brake, a non-rotating axially advanceable connection between the remotely-operated drive and the hollow shaft, and an axially advancing support between the hollow shaft on the one side and the housing on the other side via at least one elastic element stationary relative to the spindle shaft and the brake cable, the elastic element being axially loaded and thereby axially longitudinally deformable during a drive into the release position of the brake due to the advancing support while the brake cable is blocked.

Embodiment 23

A setting device according to embodiment 22, comprising the features of at least one of embodiments 2 to 12.

Although the present invention has been described with reference to preferred embodiments, workers skilled in the art will recognize that changes may be made in form and detail without departing from the spirit and scope of the invention.

The invention claimed is:

1. A setting device comprising:
a remotely-operated drive;
a hollow shaft driven by the remotely-operated drive so that the hollow shaft rotates;
a spindle shaft that moves relative to the hollow shaft within the hollow shaft due to the rotation of the hollow shaft, the spindle shaft being connected to a brake cable such that the spindle shaft can apply and release a brake as it moves in different directions within the hollow shaft; and
a first elastic element and a second elastic element;
wherein the first elastic element and the second elastic element are positioned such that, as the hollow shaft is driven by the remotely-operated drive in a direction for releasing the brake starting from a state in which the first elastic element and the second elastic element each are under load, due to movement of the hollow shaft, a load on the first elastic element can cease during the movement of the hollow shaft,
wherein the first elastic element and the second elastic element are positioned such that when the load on the first elastic element ceases, the movement of the hollow shaft has not reached the maximum spring travel of the second elastic element, whereby a load pressure on the second elastic element remains.

2. The setting device according to claim 1, further comprising a drive gear wheel driven by rotation of the remotely-operated drive and connected to the hollow shaft such that the hollow shaft is rotated by rotation of the remotely-operated drive and such that the drive gear wheel and the hollow shaft can be moved along an axis of the hollow shaft relative to the remotely-operated drive.

3. The setting device according to claim 1, further comprising:
a transmission between the remotely-operated drive and the hollow shaft; and
an intermediate gear wheel between a drive gear element of the remotely-operated drive and a drive gear wheel of the hollow shaft;
wherein the intermediate gear wheel and the drive gear wheel of the hollow shaft are enabled to move axially relative to each other at least to the extent of an operational stroke distance of the elastic elements.

4. The setting device according to claim 1, further comprising a force sensor emitter which is fixed to the hollow shaft and a force sensor receiver which is stationary relative to a housing and assigned to the force sensor emitter.

5. The setting device according to claim 4, wherein the force sensor emitter is used for determining a brake application force of a motor vehicle parking brake or for determining a brake release force of a motor vehicle parking brake or for determining both the brake application and brake release force of a motor vehicle parking brake.

6. The setting device according to claim 1, wherein the first elastic element and the second elastic element are concentrically arranged in relation to each other.

7. The setting device according to claim 1, wherein the first and second elastic elements concentrically surround the hollow shaft or the spindle shaft.

8. The setting device according to claim 1, wherein the first elastic element has an elasticity constant that is different from an elasticity constant of the second elastic element.

9. The setting device according to claim 1, wherein the first and second elastic elements are embodied as screw springs.

10. The setting device according to claim 1, wherein the first and second elastic elements are embodied as compression spring elements.

11. The setting device according to claim 1, wherein the setting device is for a motor vehicle parking brake.

12. The setting device according to claim 1, wherein a stop is provided which is configured so as to prevent the movement of the hollow shaft exceeding the maximum spring travel of the second elastic element, and wherein an axial play is provided before the stop.

* * * * *